US009431835B2

(12) United States Patent
Lowenthal et al.

(10) Patent No.: US 9,431,835 B2
(45) Date of Patent: *Aug. 30, 2016

(54) STREET LIGHT MOUNTED NETWORK-CONTROLLED CHARGE TRANSFER DEVICE FOR ELECTRIC VEHICLES

(71) Applicant: ChargePoint, Inc., Campbell, CA (US)

(72) Inventors: Richard Lowenthal, Cupertino, CA (US); David Baxter, Monte Sereno, CA (US); Harjinder Bhade, San Jose, CA (US); Praveen Mandal, Los Altos Hills, CA (US); Milton T. Tormey, Los Altos, CA (US)

(73) Assignee: CHARGEPOINT, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,058

(22) Filed: Oct. 21, 2014

(65) Prior Publication Data

US 2015/0162764 A1    Jun. 11, 2015

Related U.S. Application Data

(63) Continuation of application No. 13/149,860, filed on May 31, 2011, now Pat. No. 8,866,436, which is a continuation of application No. 12/505,394, filed on Jul. 17, 2009, now Pat. No. 7,952,319, which is a (Continued)

(51) Int. Cl.
*H01M 10/44* (2006.01)
*H01M 10/46* (2006.01)
(Continued)

(52) U.S. Cl.
CPC ............ *H02J 7/0042* (2013.01); *B60L 11/184* (2013.01); *B60L 11/1809* (2013.01);
(Continued)

(58) Field of Classification Search
CPC ........ H02J 3/02; H02J 7/0026; H02J 7/0021; H02J 11/00; Y02T 10/7005; Y02T 10/7038; Y02T 90/12; Y02T 90/127
USPC .......... 320/104, 107, 108, 115, 132; 701/22; 414/227, 268; 903/903, 907, 930; 180/65.275, 65.1, 65.21, 65.24
See application file for complete search history.

(56) References Cited

U.S. PATENT DOCUMENTS

| 4,532,418 A | 7/1985 | Meese et al. |
| 5,297,664 A | 3/1994 | Tseng et al. |

(Continued)

FOREIGN PATENT DOCUMENTS

| CN | 1372701 | 10/2002 |
| CN | 1561498 | 1/2005 |

(Continued)

OTHER PUBLICATIONS

"Vehicle-to-Grid (V2G) Technology," downloaded Jan. 10, 2008 from http://www.acpropulsion.com/technology/v2g.htm.

(Continued)

*Primary Examiner* — Edward Tso
(74) *Attorney, Agent, or Firm* — Nicholson De Vos Webster & Elliot LLP

(57) ABSTRACT

A network-controlled charge transfer device for transferring charge between a local power grid and an electric vehicle is mounted to a street light. The charge transfer device includes the following: an electrical receptacle to receive an electrical connector for connection to the electric vehicle; an electric power line that couples the power grid to the electrical receptacle through a wiring box; a control device to switch the receptacle on and off; a current measuring device to measure current flowing through the electric power line; and a controller to operate the control device and to monitor output from the current measuring device.

20 Claims, 7 Drawing Sheets

Related U.S. Application Data continuation-in-part of application No. 12/013,296, filed on Jan. 11, 2008, now Pat. No. 7,956,570.

(60) Provisional application No. 61/082,462, filed on Jul. 21, 2008, provisional application No. 61/019,474, filed on Jan. 7, 2008.

(51) Int. Cl.
| | |
|---|---|
| H02J 7/00 | (2006.01) |
| G06Q 30/04 | (2012.01) |
| G06Q 50/06 | (2012.01) |
| G07C 5/00 | (2006.01) |
| B60L 11/18 | (2006.01) |
| H02J 7/04 | (2006.01) |
| G07C 5/08 | (2006.01) |

(52) U.S. Cl.
CPC ....... *B60L 11/1816* (2013.01); *B60L 11/1824* (2013.01); *B60L 11/1825* (2013.01); *B60L 11/1838* (2013.01); *B60L 11/1842* (2013.01); *B60L 11/1844* (2013.01); *B60L 11/1846* (2013.01); *B60L 11/1848* (2013.01); *G06Q 30/04* (2013.01); *G06Q 50/06* (2013.01); *G07C 5/008* (2013.01); *H02J 7/04* (2013.01); *B60L 2230/16* (2013.01); *B60L 2230/40* (2013.01); *G07C 5/085* (2013.01); *Y02E 60/721* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01); *Y04S 50/12* (2013.01); *Y10T 307/25* (2015.04); *Y10T 307/258* (2015.04); *Y10T 307/406* (2015.04)

(56) References Cited

U.S. PATENT DOCUMENTS

| | | | |
|---|---|---|---|
| 5,548,200 | A | 8/1996 | Nor et al. |
| 5,563,491 | A | 10/1996 | Tseng |
| 5,742,229 | A | 4/1998 | Smith |
| 5,812,643 | A | 9/1998 | Schelberg, Jr. et al. |
| 5,815,824 | A | 9/1998 | Saga et al. |
| 6,081,205 | A | 6/2000 | Williams |
| 6,225,776 | B1 | 5/2001 | Chai |
| 6,314,169 | B1 | 11/2001 | Schelberg, Jr. et al. |
| 6,380,637 | B1 | 4/2002 | Hsu et al. |
| 6,466,658 | B2 | 10/2002 | Schelberg, Jr. et al. |
| 6,487,508 | B1 | 11/2002 | Suzuki et al. |
| 6,614,204 | B2 | 9/2003 | Pellegrino |
| 6,721,400 | B2 | 4/2004 | Schelberg, Jr. et al. |
| 6,791,473 | B2 | 9/2004 | Kibria et al. |
| 6,812,857 | B1 | 11/2004 | Kassab et al. |
| 6,930,410 | B2 | 8/2005 | Ikeda et al. |
| 7,254,468 | B2 | 8/2007 | Pillar et al. |
| 7,538,690 | B1 | 5/2009 | Kaplan et al. |
| 7,660,652 | B2 | 2/2010 | Smith et al. |
| 7,693,609 | B2 | 4/2010 | Kressner et al. |
| 7,747,739 | B2 | 6/2010 | Bridges et al. |
| 7,952,319 | B2 * | 5/2011 | Lowenthal et al. .......... 320/104 |
| 7,956,570 | B2 | 6/2011 | Lowenthal et al. |
| 8,063,605 | B2 | 11/2011 | Tonegawa et al. |
| 8,138,715 | B2 | 3/2012 | Lowenthal et al. |
| 8,450,967 | B2 | 5/2013 | Lowenthal et al. |
| 2002/0099574 | A1 | 7/2002 | Cahill et al. |
| 2002/0116282 | A1 | 8/2002 | Martin et al. |
| 2003/0120442 | A1 | 6/2003 | Pellegrino et al. |
| 2004/0030619 | A1 | 2/2004 | Stokes et al. |
| 2005/0035741 | A1 | 2/2005 | Elder et al. |
| 2005/0273218 | A1 | 12/2005 | Breed et al. |
| 2006/0224484 | A1 | 10/2006 | Nhaissi et al. |
| 2006/0250278 | A1 | 11/2006 | Tillotson et al. |
| 2007/0179692 | A1 | 8/2007 | Smith et al. |
| 2007/0282495 | A1 | 12/2007 | Kempton et al. |
| 2008/0040263 | A1 | 2/2008 | Pollack et al. |
| 2008/0040296 | A1 | 2/2008 | Bridges et al. |
| 2008/0052145 | A1 | 2/2008 | Kaplan et al. |
| 2008/0228613 | A1 | 9/2008 | Alexander |
| 2008/0281663 | A1 | 11/2008 | Hakim et al. |
| 2009/0021213 | A1 | 1/2009 | Johnson |
| 2009/0040029 | A1 | 2/2009 | Bridges et al. |
| 2009/0079388 | A1 | 3/2009 | Reddy |
| 2009/0082957 | A1 | 3/2009 | Agassi et al. |
| 2009/0091291 | A1 | 4/2009 | Woody et al. |
| 2009/0150073 | A1 | 6/2009 | Caraballo |
| 2009/0192927 | A1 | 7/2009 | Berg |
| 2009/0229900 | A1 | 9/2009 | Hafner et al. |
| 2010/0010698 | A1 | 1/2010 | Iwashita et al. |
| 2010/0013434 | A1 | 1/2010 | Taylor-Haw et al. |
| 2010/0228405 | A1 | 9/2010 | Morgal et al. |

FOREIGN PATENT DOCUMENTS

| | | |
|---|---|---|
| CN | 1614647 A | 5/2005 |
| EP | 1275936 A2 | 1/2003 |
| JP | 2003259552 | 9/2003 |
| JP | 2003259696 A | 9/2003 |
| JP | 2006204081 A | 9/2005 |
| JP | 2006074867 A | 3/2006 |
| JP | 200694655 | 4/2006 |
| JP | 2007066278 | 3/2007 |
| WO | 2007141543 | 12/2007 |
| WO | 0104984 A1 | 1/2011 |

OTHER PUBLICATIONS

Lin, et al., "The Installation on Public Area of Recharging Terminals for Electric Vehicles," International Electric Vehicle Symposium, Anaheim, Dec. 5-7, 1994, San Francisco, Whitepaper, pp. 126-135.

Rochereau, et al., "EDF and the Electric Vehicle: Comprehensive and standardized charging facilities," Whitepaper, Oct. 13, 1996, pp. 737-741.

PCT International Search Report and Written Opinion issued Feb. 5, 2009 for PCT/US09/30276, 10 pages.

Oregon Department of Transportation Final Report on Oregon's Mileage Fee Concept and Road User Fee Pilot Program, Nov. 2007; Oregon Department of Transportation, available at http://www.oregon.gov/ODOT/HWY/OIPP/ruftf.shtml.

First Office Action for Chinese Patent Application No. 2009/80104785.4, dated Sep. 15, 2011, 11 pages.

Second Office Action for Chinese Patent Application No. 2009/80104785.4, dated Aug. 17, 2012, 14 pages.

Notice of Allowance for U.S. Appl. No. 13/418,300, mailed Nov. 28, 2012, 10 pages.

First Examination Report for Australian Patent Application No. 2009204279, dated Dec. 3, 2012, 4 pages.

First Examination Report for New Zealand Patent Application No. 586671, mailed Jan. 12, 2012, 2 pages.

"Final Office Action for U.S. Appl. No. 12/335,274, mailed Jan. 31, 2013, 22 pages."

"Office Action for U.S. Appl. No. 13/418,296, mailed Jun. 27, 2013, 22 pages."

First Examination Report for New Zealand Patent Application 613104, dated Jul. 17, 2013, 2 pages.

First Office Action for JP 2010-542318, dated Jun. 19, 2013, 4 pages.

Final Office Action for U.S. Appl. No. 13/418,296, mailed Dec. 17, 2013, 15 pages.

Office Action for U.S. Appl. No. 13/418,296, mailed Apr. 29, 2014, 12 pages.

Notification of Reexamination for Chinese Patent Application No. 2009/80104785.4, dated Jun. 27, 2014, 36 pages.

Second Office Action for JP 2010-542318, dated Jul. 16, 2014, 4 pages.

(56) References Cited

OTHER PUBLICATIONS

Final Office Action for U.S. Appl. No. 13/418,296, mailed Aug. 6, 2014, 16 pages.
Office Action for U.S. Appl. No. 13/874,413, mailed Sep. 10, 2014, 6 pages.
Office Action for U.S. Appl. No. 12/335,274, mailed Jan. 9, 2015, 25 pages.
Third Office Action for Japanese application No. JP 2010-542318, dated Mar. 6, 2015, 11 pages.
Notice of Allowance for U.S. Appl. No. 13/874,413, dated Jun. 22, 2015, 8 pages.
First Examination Report for New Zealand Patent Application No. 703929, dated Feb. 2, 2015, 2 pages.
Notice of Allowance for U.S. Appl. No. 13/903,570, mailed Mar. 15, 2016, 7 pages.

* cited by examiner

STREET LIGHT MOUNTED NETWORK-CONTROLLED CHARGE TRANSFER DEVICE FOR ELECTRIC VEHICLES

CROSS-REFERENCE TO RELATED APPLICATIONS

This application is a continuation of application Ser. No. 13/149,860, filed May 31, 2011, which itself is a continuation of application Ser. No. 12/505,394, filed Jul. 17, 2009, which itself claims the benefit of U.S. Provisional Application No. 61/082,462, filed Jul. 21, 2008, and is a continuation-in-part of application Ser. No. 12/013,296, filed Jan. 11, 2008, which itself claims the benefit of U.S. Provisional Application No. 61/019,474, filed Jan. 7, 2008, all of which are hereby incorporated by reference.

BACKGROUND

1. Field

This invention relates to the field of systems and methods for recharging electric vehicles and for providing electricity to consumers and to network controlled electrical outlets used in such systems.

2. Background

The electric car, electric vehicle (EV) and battery electric vehicle are all used to describe automobiles powered by one or more electric motors utilizing energy stored in rechargeable batteries. The batteries are recharged by connecting to an electrical outlet. Efficient recharging of the batteries typically requires hours and is often done overnight or while the electric vehicle is parked for a significant time. The use of electric vehicles is limited by the sparse availability of recharging facilities. There is a need for more widespread recharging facilities. Furthermore, there is a need for more recharging facilities available where vehicles are parked for longer periods of time.

An important part of any consumer experience is the ease of acquiring a product—to recharge an electric vehicle this entails finding an available recharging facility, controlling the facility, and paying for the electricity consumed. There is a need for a communication network which facilitates finding the recharging facility, controlling the facility, and paying for the electricity consumed.

Electricity grids have periods of high demand from customers where the demand may approach or even exceed the electricity supply. Conversely, there are periods of low demand which coincide with high electricity production. Demand Response is a mechanism for reducing consumption of electricity during periods of high demand. For example, consumer services such as air conditioning and lighting may be reduced during periods of high demand according to a preplanned load prioritization scheme. Demand Response may also be used to increase demand at times of high electricity production. For example, the cost of electricity may be reduced during periods of low demand. Furthermore, some Demand Response systems encourage energy storage during periods of low demand, for release back into the electricity grid during periods of high demand. For example, battery electric vehicles may be charged during periods of low power demand and then release power back to the grid during periods of high demand.

Electric vehicles can be recharged from a local electricity grid. These vehicles can also be a source of electric power to be transferred to the local electricity grid. The transfer of electricity stored in electric vehicles to the local electric grid is referred to as vehicle-to-grid (V2G). V2G is particularly attractive for electric vehicles which have their own charging devices, such as battery electric vehicles with regenerative braking and plug-in hybrid vehicles. V2G is desirable for peak load leveling—helping to meet the demand for electricity when demand is at its highest. V2G is not widely available—it is principally being used in small pilot schemes. There is a need for more widely available Demand Response and V2G to assist with peak load leveling.

For Demand Response and V2G to be implemented effectively, real time communication of a need for power input into the local electricity grid is required. This communication from electric utility companies needs to reach recharging facility managers and electric vehicle owners and users. There is a need for an efficient communication network for managing peak load leveling using Demand Response and V2G.

Currently, a major source of revenue for building and maintaining highways for vehicular traffic is the gasoline tax. Should electric vehicles start to replace significant numbers of gasoline burning vehicles there will be a drop in tax revenues. To compensate for this loss in revenue, a tax on electricity consumption by electric vehicles may be imposed. Such a tax would require accurate measurement and reporting of electricity consumed by electric vehicles. Consequently, there will be a need for a system for collection of taxes and consumption information.

As is clear from the above discussion, communication networks are an essential part of electric vehicle recharging systems that will meet the needs of electric vehicle operators, recharging facility operators, utility companies and tax authorities. A survey of communication networks, ranging from local area networks to wide area networks, is provided below. There is a focus on wireless networks which would be accessible to mobile communication devices. A variety of mobile communication devices are also described.

A radio frequency identification transmitter, commonly referred to as an RFID transmitter, is used for short range communication with an RFID receiver. Typical ranges are of the order of one meter to tens of meters. An example of an RFID transmitter is a remote keyless entry device.

A radio frequency identification transceiver, commonly referred to as an RFID transceiver, is used for short range communication with an RFID transponder. (A transceiver is a device that has both a transmitter and a receiver.) Typical ranges are of the order of one meter for communication with passive transponders and hundreds of meters for communication with active transponders. The longer range of the active transponders is due to a power supply integrated into the transponder. RFID transponders store information which is broadcast over radio frequencies when prompted by a specific radio frequency signal from an RFID transceiver. An example of an RFID transponder is a FastTrak® card, primarily used for payment of automotive tolls in California. Each FastTrak® card has a unique code which is associated with a debit account. Each time a FastTrak® card passes through a toll collection point, the unique code is transmitted by the card in response to being interrogated by an RFID transceiver. The code is detected by the RFID transceiver and the toll is debited from the user's account.

A wireless personal area network (WPAN) radio frequency transceiver is used for radio frequency short range (typically within 1-100 meters) communication between devices. An example of such a device is a Bluetooth® transceiver, where Bluetooth® refers to a particular standard and protocol primarily designed for short range radio frequency communications. Another example is a ZigBee® transceiver, where ZigBee® refers to a standard and protocol designed for short range radio frequency communications. ZigBee® transceivers form mesh networks.

A wireless local area network transceiver is used for radio frequency communication over tens of meters or more between devices. An example of such a device is a Wi-Fi® device, where a Wi-Fi® device is one that is based on the IEEE 802.11 standard. Another example is a ZigBee® device—see discussion above. Wireless local area networks (WLANs) are typically configured to provide higher throughput and cover greater distances than wireless personal area networks (WPANs); a WLAN typically requires more expensive hardware to set up than a WPAN.

Power line communication (PLC) technology can be used to network computers over electrical power lines. This technology is restricted to short distances for high-speed transmission of large amounts of data. An alternating current line transceiver is used to enable PLC. A PLC network is another example of a LAN.

Wired local area networks (wired LANs), which include both wire and optical fiber, are also used to connect computers. A wired LAN is distinguished from a PLC LAN by the use of dedicated wires, used only for carrying communication signals and not used as power lines. The Ethernet is the most widespread wired LAN technology.

Wide area networks (WANs) are computer networks that cover a broad geographical area—a network that crosses city, regional or national boundaries. The best known example of a WAN is the Internet. The Internet is a worldwide, publicly accessible plurality of interconnected computer networks that use a standard protocol—Transmission Control Protocol (TCP)/Internet Protocol (IP). Many local area networks are part of the Internet. There are also privately owned WANs. The World Wide Web (WWW), often refereed to as the Web, is a collection of interconnected web pages. The Web is accessible via the Internet.

There is a need to effectively integrate these wide area networks, local area networks and short range communication devices into systems used for recharging electric vehicles.

SUMMARY OF THE INVENTION

A system for network-controlled charging of electric vehicles and the network-controlled electrical outlets used in this system are described herein. The system comprises electrical outlets, called Smartlets™, networked as follows: Smartlets™ and electric vehicle operators communicate via wireless communication links; Smartlets™ are connected by a LAN to a data control unit; and the data control unit is connected to a server via a WAN. The server stores: consumer profiles (including account information for payment); utility company power grid load data (updated in real time by the utility company); and electricity consumption data that may be required for government tax purposes. The system may be vehicle-to-grid enabled.

Vehicle operators may use a variety of mobile communication devices to communicate with the Smartlets™, including: one-way RFID, two-way RFID, WPAN and WLAN devices. Communication between the Smartlets™ and the data control unit may be either via a PLC LAN or a WLAN. The WAN may be a private WAN, or the Internet.

Some systems also include a payment station, remote from the Smartlets™, which can be set up to allow vehicle operators to pay for both parking and recharging of their vehicles. When payment stations are included in the system, the data control units may conveniently be incorporated into the payment stations. Some system may be enhanced with a device for detecting the presence of a vehicle occupying the parking space in front of the Smartlet™. Such devices may include sonar, TV camera and induction coil devices. Furthermore, parking meter display units may be attached to the Smartlets™ to provide parking information, including: (1) paid parking time remaining; and (2) parking violation.

A Smartlet™ comprises an electrical receptacle configured to receive an electrical connector for recharging an electric vehicle; an electric power line connecting the receptacle to a local power grid; a control device on the electric power line, for switching the receptacle on and off; a current measuring device on the electric power line, for measuring current flowing through the receptacle; a controller configured to operate the control device and to monitor the output from the current measuring device; a local area network transceiver connected to the controller, the local area network transceiver being configured to connect the controller to the data control unit; and a communication device connected to the controller, the communication device being configured to connect the controller to a mobile wireless communication device, for communication between the operator of the electric vehicle and the controller.

A method of transferring charge between a local power grid and an electric vehicle is disclosed herein. The method comprises the following steps: (1) assembling a user profile, the user profile containing payment information, the user profile being stored on a server; (2) providing an electrical receptacle for transferring charge, the receptacle being connected to the local power grid by an electric power line, charge transfer along the electric power line being controlled by a controller configured to operate a control device on the electric power line; (3) receiving a request to the controller for charge transfer, the request being made from a mobile wireless communication device by an operator of the electric vehicle, the controller being connected to a communication device for communication with the mobile wireless communication device; (4) relaying the request from the controller to the server, the controller being connected to a local area network for communication to the server via a wide area network; (5) validating a payment source for the operator of the electric vehicle based on the user profile corresponding to the operator; (6) enabling charge transfer by communicating from the server to the controller to activate the control device; (7) monitoring the charge transfer using a current measuring device on the electric power line, the controller being configured to monitor the output from the current measuring device and to maintain a running total of charge transferred; (8) detecting completion of the charge transfer; and (9) on detecting completion, sending an invoice to the payment source and disabling charge transfer.

The method of transferring charge between a local power grid and an electric vehicle may also include the step of determining charge transfer parameters. This determination may be based on power grid load data, provided by the utility company and available on the server. For example, the utility company's Demand Response system may limit recharging of electric vehicles during periods of high electricity demand. This determination may also be made based on the user profile provided by the vehicle operator and available on the server. The user profile may include information such as whether the vehicle operator wants to: charge the electric vehicle only during periods of lower power rates; not charge the vehicle during periods of high power grid load; and sell power to the local grid.

Furthermore, the method of transferring charge between a local power grid and an electric vehicle may also include the steps of: determining availability of parking spaces with Smartlets™; communicating availability to the server where the information is accessible by vehicle operators on the Web. A vehicle detector, as described above, may be used to determine whether a parking space is available.

When a payment station is available to a vehicle operator, a request to the Smartlet™ controller for vehicle charging may be made from the payment station instead of by a mobile communication device. Furthermore, the payment station may be used to pay for parking, independent of electric vehicle recharging.

The system of the invention may be used to assist in collecting a tax on electricity consumption by electric vehicles. The Smartlet™ system provides accurate measurement and reporting of electricity consumed by electric vehicles.

The Smartlet™ network may be used for home charging of electric vehicles, in which case a Smartlet™ receptacle in the home is connected via a LAN and a WAN to the Smartlet™ server. Furthermore, the Smartlet™ network may also be used for non-vehicle applications, including selling electricity to people in places such as airports and coffee shops.

In some embodiments, the Smartlet™ can be mounted to a street light and wired to the same wiring box as the street light. The Smartlet™ can monitor the amount of current used from the power grid (or generated to the power grid) and can report the metering information to the utility company operating the power grid. In some embodiments the Smartlet™ can also act as a meter for the street light by monitoring the amount of current drawn by the street light.

BRIEF DESCRIPTION OF THE DRAWINGS

The invention may best be understood by referring to the following description and accompanying drawings that are used to illustrate embodiments of the invention.

DETAILED DESCRIPTION

Figure 1:
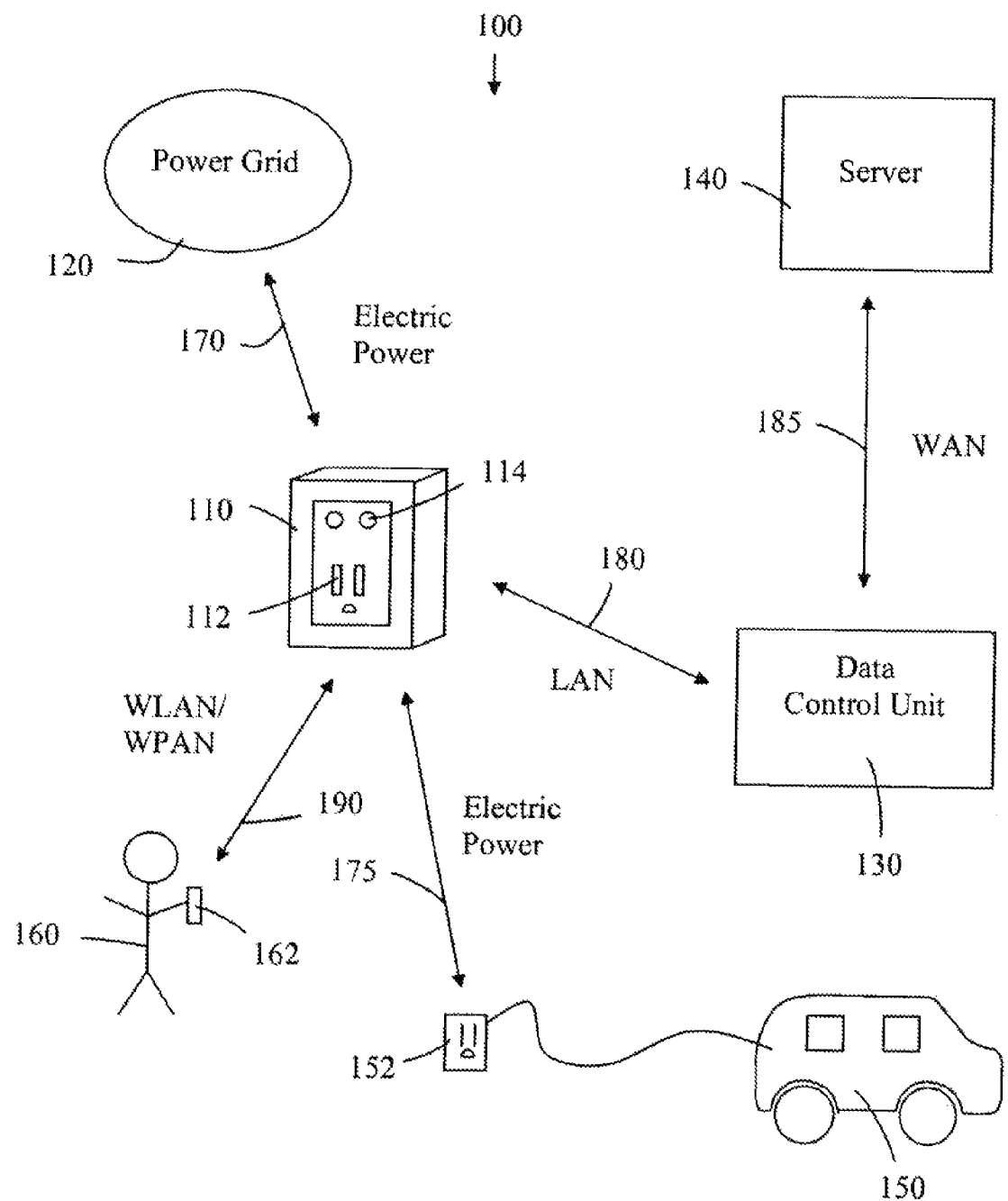
FIG. 1 is a schematic diagram of a network-connected charging outlet system according to a first embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The techniques shown in the figures can be implemented using code and data stored and executed on one or more electronic devices (e.g., a network-controlled charge transfer device, a server, etc.). Such electronic devices store and communicate (internally and with other electronic devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

A first embodiment of the network-controlled charge transfer system 100 for charging electric vehicles is shown in FIG. 1. The system 100 comprises a network-controlled charge transfer device 110, a local power grid 120, a data control unit 130, and a server 140. The system 100 interfaces with an electric vehicle 150, with an electrical connector 152, and an electric vehicle operator 160, via a mobile communication device 162. The network-controlled charge transfer device 110, referred to herein as a Smartlet™, is connected to the local power grid 120 by an electric power line 170, and to the electric vehicle 150 by the electrical connector 152. The flow of electrical power may be in either direction for both of these electrical connections. In other words, the electric vehicle 150 can be recharged from the local power grid 120, or the local power grid 120 can receive power from the electric vehicle 150. The Smartlet™ 110 has a communication link to the data control unit 130 over a local area network (LAN) 180. The LAN 180 may be either a wireless local area network (WLAN) or a power line communication (PLC) network. The data control unit 130 has a communication link to the server 140 over a wide area network (WAN) 185. The electric vehicle operator 160 uses the mobile communication device 162 to establish a communication link to the Smartlet™ 110 over a wireless network 190. This wireless network may be a WLAN or a wireless personal area network (WPAN). The communication link between the electric vehicle operator 160 and the Smartlet™ 110 allows information to be shared which enables recharging of the electric vehicle 150.

The Smartlet™ 110 comprises an electrical receptacle 112 and indicator lights 114. The electrical receptacle 112 and the electrical connector 152 are configured to make an electrical connection allowing safe flow of electrical power between the Smartlet™ 110 and the electrical vehicle 150. Examples of suitable receptacles are those conforming to the NEMA (National Electrical Manufacturers Association) standards 5-15, 5-20 and 14-50. Although, other receptacles will be used for systems outside the United States which operate at voltages other than 110V (for example 220V) and which are required to meet different standards. In preferred embodiments the electrical receptacle 112 has a cover. The cover is lockable and is released by the Smartlet™ 110 upon receipt of a request for charging of an electrical vehicle 150 by the electric vehicle operator 160. This request may be made by the mobile communication device 162, as described above.

The indicator lights 114 are used to show the operational status of the Smartlet™ 110—for example, the status may be: charging in progress, charging complete, vehicle-to-grid (V2G) in progress and error warning. The indicator lights 114 may be LEDs (light emitting diodes), may be capable of showing a number of different colors and may be capable of continuous or flashing modes of operation. Alternatively, the indicator lights 114 may be replaced by an alphanumeric display.

The local power grid 120 is the electrical supply grid owned and operated by local utility companies. Although, the local power grid 120 does extend to parts of the electrical supply network that are not owned by the utility company, such as electrical cables on private premises.

The data control unit 130 acts as a bridge between the LAN and the WAN, and enables communication between the Smartlet™ 110 and the server 140. The server 140 is generally remote from the Smartlet™ 110.

The system 100 is shown in FIG. 1 with only one Smartlet™ 110; however, the system will be comprised of many Smartlets™ 110, all linked to the server 140 through one or more data control units 130. There will typically be one data control unit 130 for each group of geographically proximate (within the range of the same local area network) Smartlets™ 110. In addition, in some embodiments the data control unit 130 is included within the Smartlet™ 110 and one or more other Smartlets™ communicate with the server 140 through the data control unit 130 within the Smartlet™ 110.

In some embodiments, the Smartlet™ 110 can operate in a dual charging mode at different voltages (e.g., 120V and 240V). By way of example, a fixably attached charging cord is typically used in a higher voltage mode (e.g., 240V) and an unattached charging cord is used in a lower voltage mode (e.g., 120V). The fixably attached charging cord is attached to the Smartlet™ 110 and cannot typically be removed by an electric vehicle operator. If a fixably attached charging cord is used, an electric vehicle operator does not insert a plug into the electrical receptacle 112, but rather uses the fixably attached charging cord to make an electrical connection between their electric vehicle and the Smartlet™ 110 thereby allowing the safe flow of electrical power between the Smartlet™ 110 and their electric vehicle.

The electric vehicle 150 is any battery operated electric vehicle, including EVs and plug in hybrids. Electric vehicles 150 that have the necessary V2G electronics are able to provide power to the local power grid 120.

The mobile communication device 162, used by the electric vehicle operator 160, can be any type of WLAN or WPAN compatible device. Examples of compatible devices are: one way and two-way RFID devices, an example of the latter being a FasTrac® card; Wi-Fi® devices, such as a personal computer; BlueTooth® devices, such as a mobile phone; and ZigBee® devices. In some embodiments of the invention the vehicle user 160 can monitor charging using the mobile communication device 162. This can be implemented by allowing access to the vehicle user 160 of the power consumed by the electric vehicle 150, which is monitored by the Smartlet™ 110 and stored on the server 140. Access can either be directly to the Smartlet™ 110 over a LAN or to the server 140 over the Internet.

Figure 2:
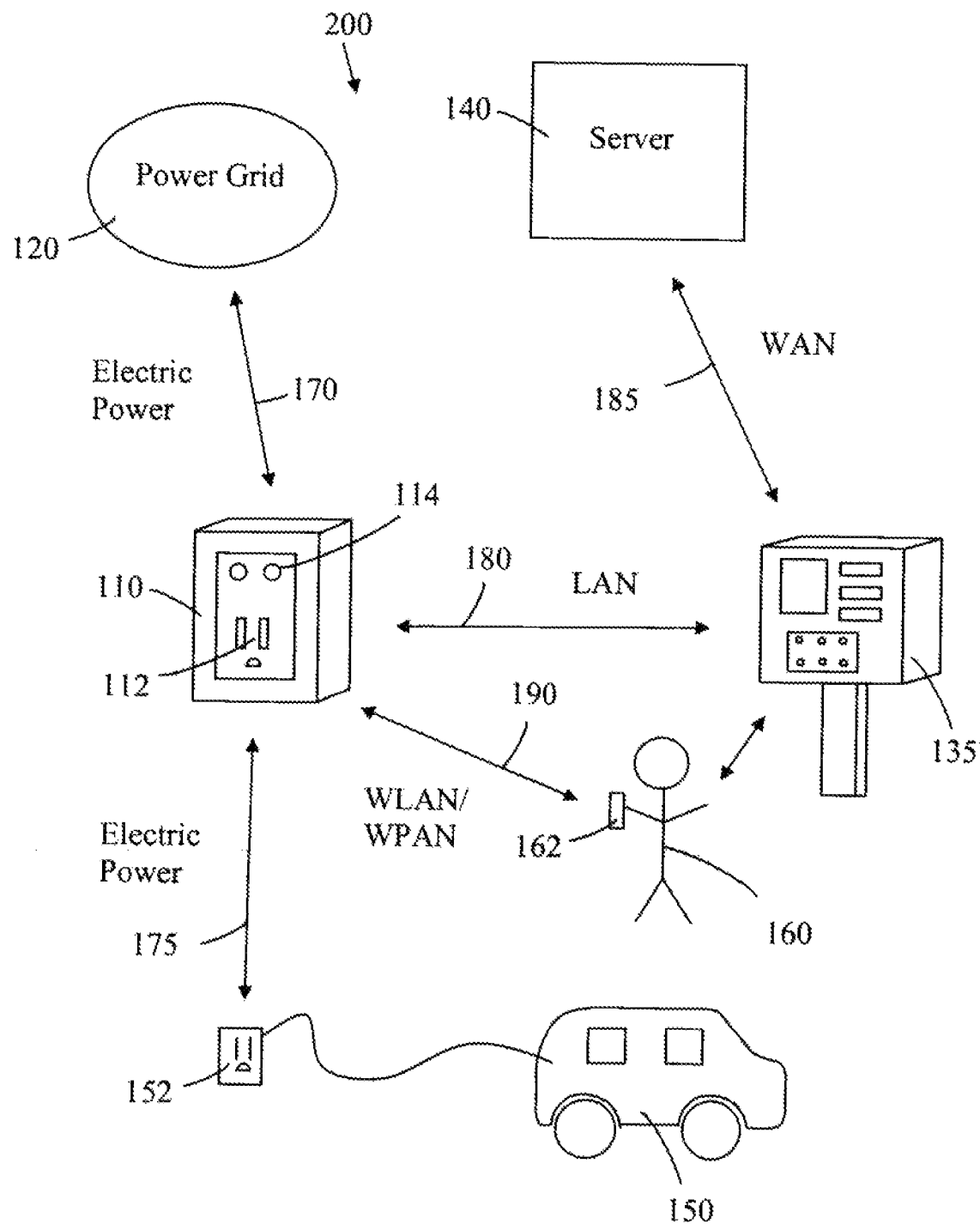
FIG. 2 is a schematic diagram of a network-connected charging outlet system according to a second embodiment of the invention.

A second embodiment of the network controlled charge transfer system 200 for charging electric vehicles 150 is shown in FIG. 2. The system 200 comprises a network-controlled charge transfer device (Smartlet™ 110, a local power grid 120, a payment station 135, and a server 140. The system 200 interfaces with an electric vehicle 150, with an electrical connector 152, and an electric vehicle operator 160, via a mobile communication device 162. The Smartlet™ 110 is connected to the local power grid 120 by an electric power line 170, and to the electric vehicle 150 by the electrical connector 152. The flow of electrical power may be in either direction for both of these electrical connections. The Smartlet™ 110 has a communication link to the payment station 135 over a LAN 180. The LAN 180 may be either a WLAN or a PLC network. The payment station 135 has a communication link to the server 140 over a WAN 185. (In this embodiment, the payment station 135 is taking the place of the data control unit 130 for acting as a bridge between the LAN and the WAN.) The electric vehicle operator 160 may use the mobile communication device 162 to establish a communication link to the Smartlet™ 110 over a wireless network 190. This wireless network may be a WLAN or a WPAN. Instead of using a mobile communication device 162, the electric vehicle operator 160 may manually interact with the payment station 135, which then sends appropriate instructions to the Smartlet™ 110 regarding charging of the electric vehicle 150. In preferred embodiments these instructions will include an instruction to unlock a cover over the electrical receptacle 112, thus allowing the vehicle operator 160 to connect the electric vehicle 150 to the electrical receptacle 112 with the electrical connector 152.

The payment station 135 can be several tens of meters remote from the Smartlet™ 110. The payment station 135 is shown comprising a currency reader, a credit card reader, a receipt printer, a display and input buttons. However, the payment station does not have to include all of these components. For example, some payment stations may not include a currency reader and will only allow payment by credit card using the credit card reader. The electric vehicle operator 160 can use the payment station 135 to pay for and schedule recharging of the electric vehicle 150, and also for V2G transactions. The payment station 135 may also be used to pay for parking. Further details of the payment station 135 are provided in FIG. 6 and the related description.

Figure 3:
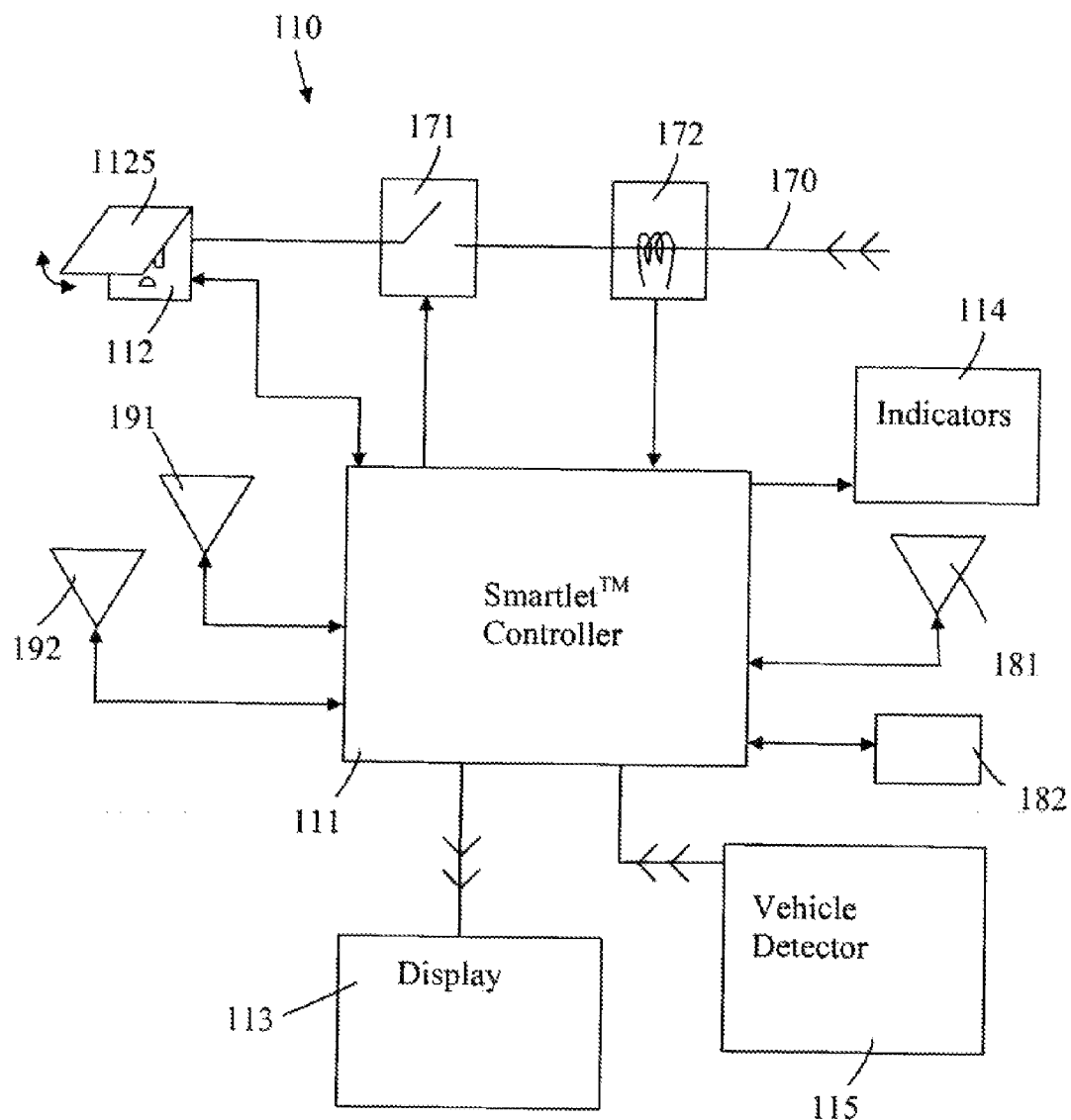
FIG. 3 is a schematic circuit diagram of a network-connected charging outlet of the invention.

A schematic of the Smartlet™ 110 is provided in FIG. 3. As illustrated in FIG. 3, the Smartlet™ 110 comprises an electrical receptacle 112, a lockable cover 1125 over the electrical receptacle 112, a control device 171, a current measuring device 172, an electric power line 170, a controller 111, a display unit 113, a vehicle detector 115, a WLAN transceiver 181, an alternating current line transceiver 182, a WPAN transceiver 191 and an RFID transceiver 192.

Electric power is delivered to receptacle 112 along power line 170. Controller 111 is used to lock and unlock the cover 1125; the lock mechanism is electro-mechanical. When unlocked, the cover 1125 may be lifted by the vehicle operator 160 in order to connect the electric vehicle 150 to the electrical receptacle 112 using the electrical connector 152. Control device 171 is used to turn the electric supply at the receptacle 112 on and off. The control device 171 is preferably a solid state device and is controlled by controller 111. The current flowing along the power line 170 is measured by current measuring device 172. An example of a suitable measuring device 172 is an induction coil. The controller 111 is programmed to monitor the signal from the current measuring device 172 and to calculate the total power either: consumed (in recharging the electric vehicle); or transferred to the local power grid 120 from the electric vehicle 150 (V2G). It is also envisaged that power may be both consumed and transferred to the grid during the time an electric vehicle is connected to the Smartlet™ 110, in which case the controller 111 will calculate both the power consumed and the power transferred to the local power grid 120.

The indicators 114 and display 113 are controlled by the controller 111 and are used to provide information to the Smartlet™ 110 user. The indicators 114 are discussed in more detail above, with reference to FIG. 1, and the display 113 is discussed in more detail below with reference to FIG. 4.

Vehicle detector 115 is used to detect the presence of a vehicle in the parking space corresponding to the Smartlet™ 110. The vehicle detector 115 is controlled by the controller 111. The vehicle detector 115 is a detector such as a sonar sensor array, a camera, or an induction coil. The sonar array is an array as used on the rear bumper of automobiles to detect close proximity to an object; this array can be attached to the Smartlet™ 110 or will be mounted to a support structure in close proximity to the Smartlet™ 110. The camera is a digital camera providing a video signal to the Smartlet™ 110; the video signal is processed by an object recognition program to detect the presence of a vehicle or other obstruction. The induction coil is either embedded in the pavement of the parking space or is protected by a roadworthy casing attached to the surface of the pavement. The induction coil is connected to the Smartlet™ 110 and detects the presence of large metal objects in close proximity to the coil (such as an engine block, electric motor or rear differential of a vehicle).

The controller 111 is shown with four transceivers—a WLAN transceiver 181, an alternating current line transceiver 182, a WPAN transceiver 191 and an RFID transceiver 192. A transceiver is a device that both sends and receives signals, allowing for two-way communication. The WLAN transceiver 181 allows for the controller to communicate with mobile communication devices which are carried by a vehicle operator 160 (see communication link 190 in FIGS. 1 & 2) and with a data control unit 130 or payment station 135 (see communication link 180 in FIGS. 1 & 2). WLAN transceiver 181 could be a Wi-Fi® transceiver. The alternating current line transceiver allows the controller to communicate on a PLC network with a control data unit 130 or payment station 135 (see communication link 180 in FIGS. 1 & 2). The WPAN transceiver 191 allows the controller 111 to communicate with mobile communication devices 162 which are carried by the vehicle operator 160. WPAN transceiver 191 could be a BlueTooth® or ZigBee® transceiver. The RFID transceiver 192 allows the controller to communicate with a compatible RFID device carried by the vehicle operator 160. An example of an RFID device that could be carried by the vehicle operator 160 is a FasTrak® card. A FasTrak® device is an example of a two-way RFID communication device. Although, a one-way RFID communication device from vehicle operator 160 to controller 111 can be utilized. Not all embodiments of the Smartlet™ 110 have all four types of transceiver; however, all Smartlet™ 110 will have at least one wireless transceiver for communication with compatible mobile wireless communication devices 162 available to vehicle operators 160, and one transceiver for communication with the data control unit 130. See FIGS. 1 & 2.

Figure 4:
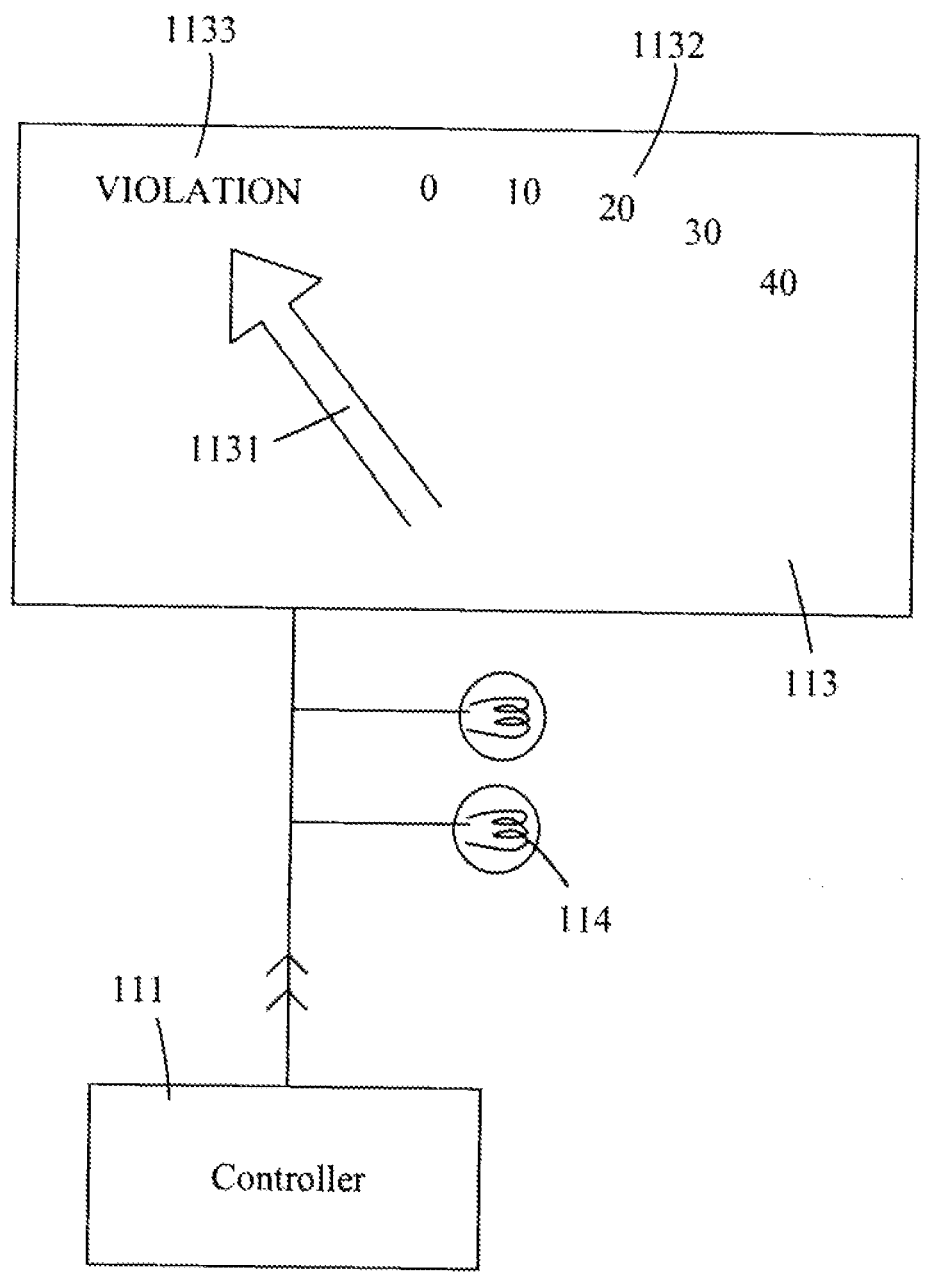
FIG. 4 is a schematic circuit diagram of a parking meter display unit of the invention.

A more detailed view of the display unit 113 is shown in FIG. 4. An example of parking information is shown on the display unit 113—an indicator 1131 shows the paid parking time remaining in minutes 1132 or a parking violation 1133. This parking information may be displayed in many other ways than that shown in FIG. 4. The display unit 113 may be an LCD (liquid crystal display); although other passive flat panel displays such as OLEDs (organic light emitting displays) and other emissive flat panel displays such as FEDs (field emission displays) may be used. When a passive display unit 113 is used it is preferred that it be backlit, so as to be readily viewed in low ambient light conditions. The display unit 113 is attached to the Smartlet™ 110 so that it is readily observable by the vehicle operator 160. For example, the display 113 may be mounted on a pole at a height of approximately 125 cm above the pavement, and the Smartlet™ 110 would also be mounted on the pole at a convenient height for the vehicle operator. The indicator lights 114 may be positioned next to the display 113, or may be positioned on the Smartlet™ 110 itself, as shown in FIGS. 1 & 2. The display 113 is controlled by the controller 111. The display 113 may also be used to display information regarding the vehicle charging process, such as: time charging, power consumed, estimated time to completion of charging, vehicle-to-grid (V2G) power transferred, general status indications and error warnings.

Figure 5:
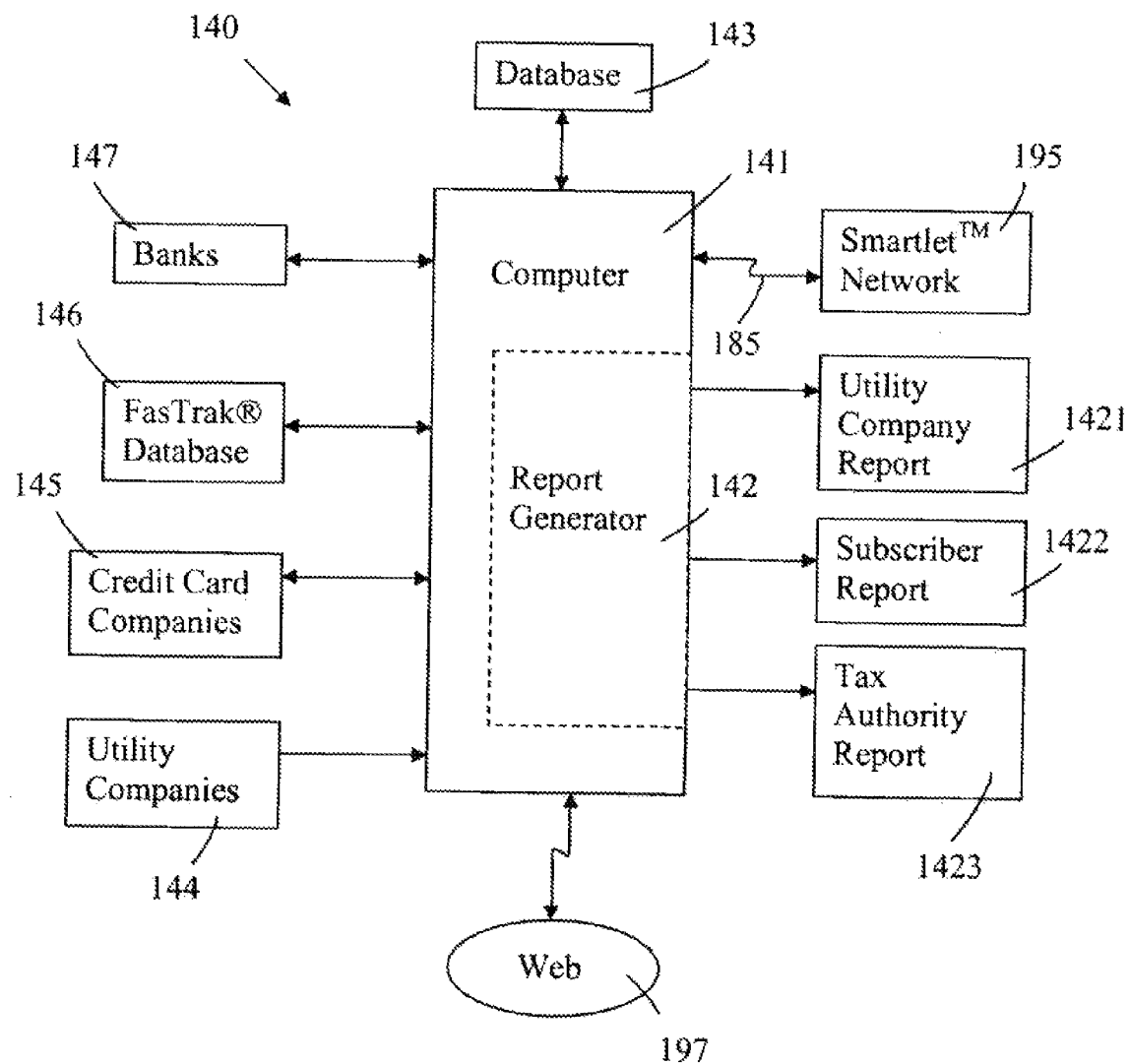
FIG. 5 is a schematic diagram of a server of the invention.

A schematic diagram of the server 140 is shown in FIG. 5. The server 140 comprises a computer 141, report generator 142, and database 143. The server 140 is configured to communicate with the following: Smartlet™ network 195; World Wide Web 197; utility companies 144, for receiving power load management data; credit card companies 145, for credit authorization and charging; FasTrak® database 146, for debiting FasTrak® accounts; and banks 146, for debiting bank accounts. The database 143 is used to store consumer profiles and other data required for report generation, as described below.

The report generator 142 creates reports such as: utility company reports 1421, detailing power consumed and V2G power sold to local power grid 120; subscriber reports 1422, detailing power consumed and V2G power sold to the local power grid 120, account balance, payments and invoices, and subscriber profile data; and tax authority reports 1423, providing details of taxable transactions.

The Smartlet™ network 195 comprises a multiplicity of data control units 130 and/or payment stations 135, each data control unit 130 and/or payment station 135 being connected by a communication link 180 to a multiplicity of Smartlets™ 110. The communication link 185 between the computer 141 and the Smartlet™ network 195 is a WAN.

The server 140 is interfaced with the Web 197 to allow subscribers (owners and operators 160 of electric vehicles 150) to do the following: (1) set-up user/consumer profiles; and (2) determine availability of Smartlets™ 110 for recharging their electric vehicles 150. A user profile contains financial account information—details required for payment—and may also include information such as whether the vehicle operator wants to: charge the electric vehicle only during periods of lower power rates; not charge the vehicle during periods of high power grid load; and sell power to the local grid. The availability of Smartlets™ 110 is stored on the server and the information is collected from the Smartlet™ network 195. There are two ways that the availability of a Smartlet™ 110 can be determined: (1) using a vehicle detector 115 (see FIG. 3 and related description) to determine whether the parking space corresponding to the Smartlet™ 110 is available; and (2) flagging a Smartlet™ 110 as being unavailable whenever charging is ongoing, V2G is ongoing or parking has been paid for.

Figure 6:
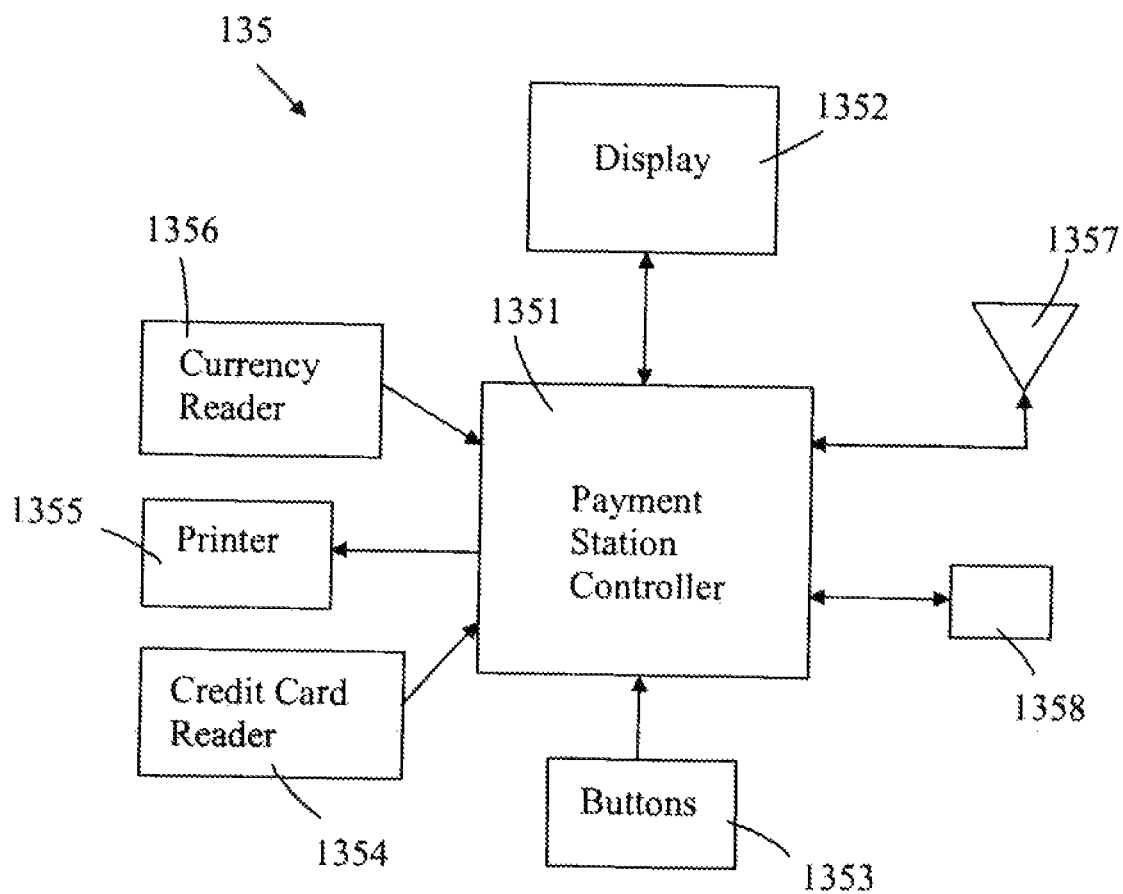
FIG. 6 is a schematic diagram of a remote payment system of the invention.

A schematic diagram of the payment station 135 is shown in FIG. 6. The payment station 135 comprises a controller 1351, a display 1352, a set of buttons 1353, a credit card reader 1354, a receipt printer 1355, a currency reader 1356, a wireless transceiver 1357 and an alternating current line transceiver 1358.

The display 1352 provides a vehicle operator 160 with information regarding recharging and/or parking their electric vehicle 150. The display 1352 shares the same characteristics as the display 113 discussed above with reference to FIG. 4. However, the display 1352 may also be touch sensitive, allowing a vehicle user to input information directly on the display screen 1352. The buttons 1353 allow for input of information requested from the display 1352.

The credit card reader 1354 is used for reading credit cards, debit cards, smart cards, and other cards that are used for identification purposes or for making payment. The printer 1355 is used for printing receipts, when requested by the consumer. The printer 1355 may also be used to print receipts for displaying in the electric vehicle 150 to show that recharging and/or parking is properly permitted. The currency reader 1356 is used for accepting currency—notes and/or coins—for payment. The currency reader 1356 is able to authenticate and identify the value of currency accepted.

The payment station 135 is networked to Smartlets™ 110 via either a WLAN or a PLC. The payment station controller 1351 takes the place of data control unit 130 in acting as a bridge between the LAN 180 and the WAN 185. See FIGS. 1 & 2.

A vehicle user 160 can use the network-controlled charge transfer systems 100 and 200 for charging their electric vehicle 150. A vehicle user 160 who has a user profile on the server 140 is referred to as a subscriber. Some examples of how the systems 100 and 200 can be used are provided below.

Vehicle Charging Utilizing a Mobile Wireless Communication Device 1. a subscriber uses the Internet to establish a profile, which includes setting-up payment by credit card, debiting a bank account, a FasTrak® account, a Paypal® account, or other financial service;
2. the subscriber uses a wireless mobile communication device 162, such as a mobile phone or a FasTrak® card, to request to the Smartlet™ 110 to charge the electric vehicle 150;
3. the subscriber connects the electric vehicle 150 to the Smartlet™ 110 using the connector 152 (see FIGS. 1 & 2);
4. the Smartlet™ 110 relays this request over the communication network to the server 140;
5. the server 140 accesses the subscriber profile from the database 143, validates the payment source by contacting the credit card company, FasTrak® database or bank, and via the communication network enables the Smartlet™ 110 to charge the vehicle 150;
6. based on the subscriber profile and load management data from the utility company the server determines the charging periods and communicates this information to the Smartlet™ 110;
7. the Smartlet™ 110 monitors the charging current, as described above with reference to FIG. 3;
8. when the vehicle 150 is disconnected from the Smartlet™ 110, charging is disabled and a bill is sent to the payment source. Note that determining when the electric vehicle 150 is disconnected from the Smartlet™ 110 can be done by: detecting when the current flow goes to zero; or using a sensor on the receptacle 112 which detects the mechanical removal of the connector 152. If a sensor is used, the sensor is monitored by controller 111. See FIG. 3.

Note that the load management data from the utility company may limit the ability to recharge the vehicle 150 or the recharge rate for vehicle 150, according to a Demand Response system. For example, the utility company could send a message to the Smartlet™ server 140 requiring a reduction in load. The Smartlet™ server 140 then turns off charging of some vehicles 150. Which vehicles have charging stopped will depend on the subscriber profiles and the requirements of the Demand Response system. The Demand Response system and subscriber profiles may also allow for V2G.

The general procedure described above is also followed for V2G or a combination of charging and V2G, except that V2G will result in credits to the subscriber's account for sale of power to the local power grid 120.

Vehicle Charging Utilizing a Payment Station 1. vehicle user 160 uses the payment station 135 to request and pay for charging the vehicle 150;
2. vehicle user 160 connects the electric vehicle 150 to the Smartlet™ 110 using connector 152;
3. the payment station 135 communicates via WAN 185 with server 140 for payment authorization;
4. the payment station 135 enables the Smartlet™ 110 for charging;
5. when the vehicle is disconnected from the Smartlet™ 110, charging is disabled, the payment station 135 is notified, the payment station 135 notifies the server 140 and a bill is sent to the payment source.

Note that the load management data from the utility company may limit the ability to recharge the vehicle 150 or the recharge rate for vehicle 150, according to a Demand Response system.

The general procedure described above is also followed for V2G or a combination of charging and V2G, except that V2G will result in credits to the vehicle user's account for sale of power to the local power grid 120.

Vehicle Parking Utilizing a Mobile Wireless Communication Device 1. a subscriber uses the Internet to establish a profile, which includes setting-up payment by credit card, debiting a bank account, a FasTrak® account, a Paypal® account, or other financial service;
2. the subscriber uses a wireless mobile communication device 162, such as a mobile phone, to request to the Smartlet™ 110 parking for the vehicle 150;
3. the Smartlet™ 110 relays this request over the communication network to the server 140;
4. the server 140 accesses the subscriber profile from the database 143, validates the payment source by contacting the credit card company, FasTrak® database or bank, and via the communication network sends a message to the Smartlet™ 110 to allow parking of the vehicle 150;
5. the Smartlet™ 110 sets the parking meter shown on display 113 (see FIGS. 3 & 4) and sets the indicators 114, if used;
6. the server 140 sends a bill to the payment source.

Optionally, if a vehicle detector 115 is used to detect the presence of a vehicle, then the amount of time a vehicle is parked without proper payment may be monitored and communicated to the payment station 135 and server 140.

Vehicle Parking Utilizing a Payment Station 1. vehicle user 160 uses the payment station 135 to request and pay for parking the vehicle 150;
2. the payment station 135 communicates via WAN 185 with server 140 for payment authorization;
3. the payment station 135 communicates to the Smartlet™ 110 to allow parking;
4. the server 140 sends a bill to the payment source.

The above methods for use of the Smartlet™ network for electric vehicle charging, V2G and parking can be combined. For example, a parking fee may be imposed in addition to a fee for power consumed in recharging a vehicle. Also, a parking fee may be imposed when a vehicle is parked for V2G.

Street Light Mounted Network-Controlled Charging System

Figure 7:
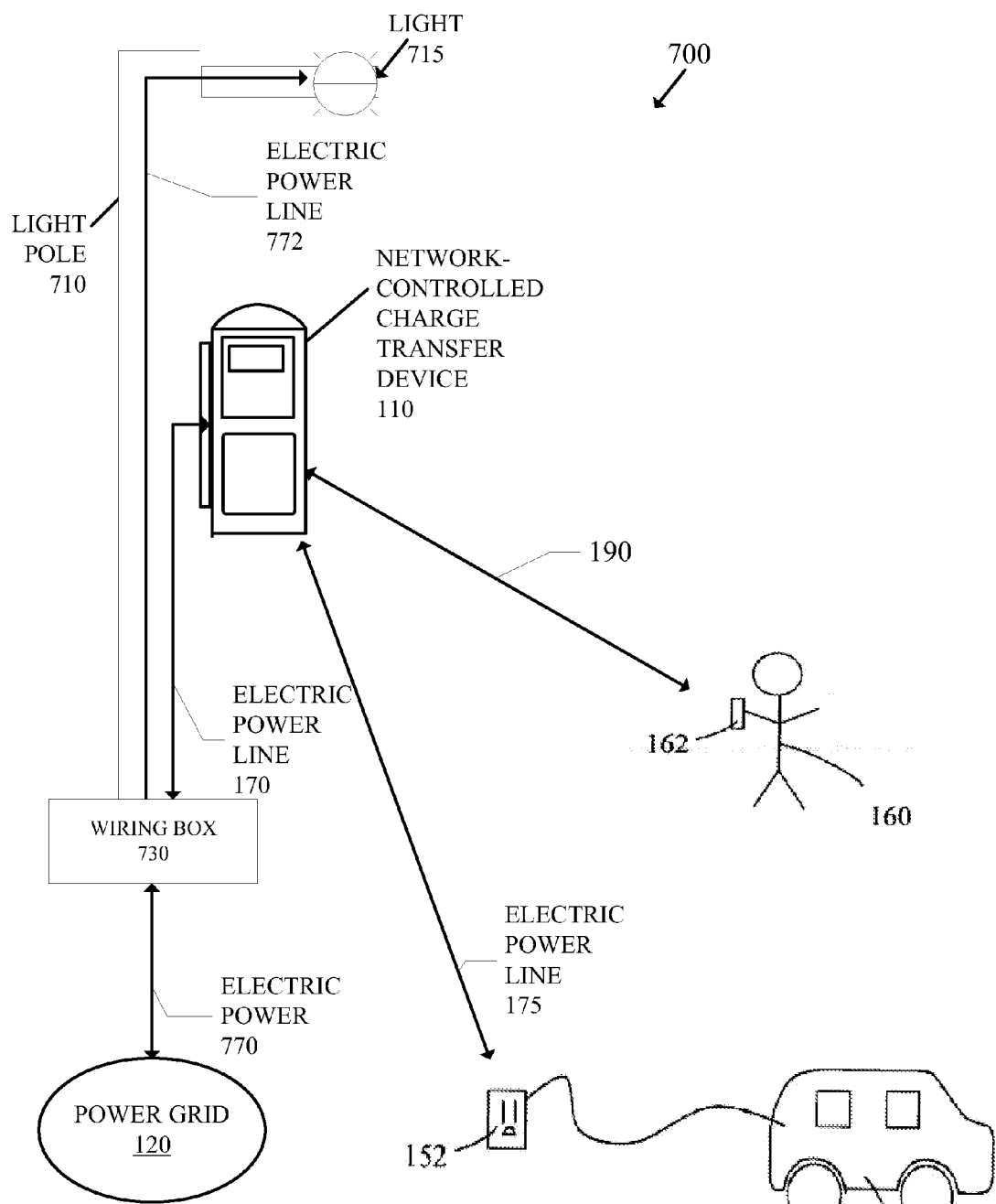
FIG. 7 is a schematic diagram of a network-controlled charge transfer device mounted on a light pole according to one embodiment of the invention.

According to one embodiment of the invention, the Smartlet™ 110 is coupled with a street light and connects to the power grid through wiring of that street light. FIG. 7 illustrates an exemplary network-controlled charge transfer system 700 for charging electric vehicles where the Smartlet™ 110 is coupled (e.g., mounted) with the street light pole 710 and is connected to the power grid 120 through the wiring of the light pole 710. The system 700 interfaces with an electric vehicle 150, with an electrical connector 152, and an electric vehicle operator 160, via the mobile communication device 162. Of course, it should also be understood that the operator 160 may interface with the system 700 without the mobile communication device 162 (e.g., the operator 160 may use input/output device(s) on the Smartlet™ 110 (e.g., keypad, touchscreen, etc.)) to interface with the system 700 or use the mobile communication device 162 in combination with other mechanisms.

The light pole 710 is connected with the local power grid 120 through the wiring box 730 and the electric power line 770. The electric power line 772, which provides electricity to illuminate the light 715, is coupled with the wiring box 730 and is coupled to the power grid 120 via the electric power line 770. The Smartlet™ 110 is coupled with the light pole 710 and is coupled, via the electronic power line 170, with the wiring box 730 (which is connected to the power grid 120 via the electric power line 770). Thus, the wiring box 730 couples the electric power lines 772 and 170 with the electric power line 770 allowing the light pole 710 and the Smartlet™ 110 access to the power grid 120 respectively.

In addition, the Smartlet™ 110 is coupled with the electric vehicle by the electrical connector 152 over the electric power line 175. As described earlier with reference to other embodiments of the invention, the flow of electrical power may be in either direction for the electric power lines 770, 170, and 175. Thus, the electric vehicle 150 can be recharged from the local power grid 120 and/or the local power grid 120 can receive power from the electric vehicle 150.

Although not illustrated in FIG. 7, it should be understood that in some embodiments of the invention the Smartlet™ 110 is linked to the data control unit (DCU) 130 (e.g., over the LAN 180) and coupled with the server 140 (e.g., via the DCU 130) and operations are performed in a similar fashion to that described in reference to FIG. 1. In addition, it should be understood that in some embodiments of the invention the Smartlet™ 110 is liked to the payment station 135 over the LAN 180 and operations are performed in a similar fashion as described in reference to FIG. 2.

Typically, most light poles do not include a metering device. In other words, most light poles do not measure the amount of current they use at any given time. However, as described with reference to FIG. 3, the Smartlet™ 110 includes a current measuring device 172 that measures the amount of current flowing across the electric power line 170. In addition, the controller 111 monitors the signal from the measuring device 172 and calculates the amount of power either consumed from the electric power line 170 (and thus drawn from the electric power line 770) (e.g., when recharging electric vehicles and/or the Smartlet™ 110 consumes power for internal operation); or transferred to the local power grid 120 from the electric vehicle 150 (e.g., in a V2G case). It should be understood that the Smartlet™ 110 measures and accounts for electricity used and/or generated from individual customers (operators of electric vehicles) and measures and accounts for the total amount of electricity drawn from the power grid 120 and/or added to the power grid 120. Thus, the Smartlet™ 110 may cause individual customers to be charged a monetary amount corresponding to the amount of electricity they have used, and/or cause those customers to be credited and/or paid for the amount of electricity they have produced, while accounting for the total amount of power used from, and/or generated to, the power grid 120. Thus, the Smartlet™ 110 measures the amount of power that it draws from the power grid 120 (via the electric power lines 170 and 770) and the amount of power it adds to the power grid 120 (via the electric power lines 170 and 770). Thus, even if the light pole 710 does not include a metering device, the amount of electricity drawn from the wiring of the light pole 710 is accurately measured and accounted, and the amount of electricity added to the power grid 120 is accurately measured and accounted.

The Smartlet™ 110 may report the metering information associated with the wiring of the light pole 710 (e.g., the amount of electricity used from, and generated to, the power grid 120 from the wiring of the light pole 710) to the utility company operating the power grid 120 for accounting and billing purposes. For example, in one embodiment of the invention, the Smartlet™ 110 reports the metering information associated with the wiring of the light pole 710 to a server accessible to the utility company operating the power grid 120. For example, the Smartlet™ 110 reports the metering information over the LAN 180 (e.g., using wired and/or wireless mechanisms) to the DCU 130 which transmits the metering information to the server 140 (which may be accessible by the utility company operating the power grid 120). In another embodiment of the invention, the Smartlet™ 110 reports the metering information associated with the wiring of the light pole 710 directly to the utility company operating the power grid 120. In yet another embodiment of the invention, a utility worker accesses the Smartlet™ 110 to read the metering information.

In one embodiment of the invention, the Smartlet™ 110 measures only the current flowing through the electric power line 170 and does not measure the current flowing through the electric power line 772. For example, the Smartlet™ 110 does not measure the amount of current in the electric power line 772 flowing to the light 715 of the light pole 710. In another embodiment of the invention, the Smartlet™ 110 measures the amount of current flowing through the electric power line 170 and separately measures the amount of current flowing through the electric power line 772. Thus, in this embodiment of the invention, the Smartlet™ 110 may also act as a meter for the light pole 710. It should also be understood that the Smartlet™ 110 may report the metering information of the light pole 710.

While embodiments of the invention have described the Smartlet™ 110 coupled with the wiring box 730, in alternative embodiments of the invention the Smartlet™ 110 is directly coupled with the electric power line 772. That is, in some embodiments of the invention, the Smartlet™ 110 shares the electric power line 772 with the light 715 of the light pole 710.

The above embodiments of the present invention have been given as examples, illustrative of the principles of the present invention. Variations of the apparatus and method will be apparent to those skilled in the art upon reading the present disclosure. These variations are to be included in the spirit of the present invention. For example, the Smartlet™ network may be used for public and private garage and parking lot charging of electric vehicles. Furthermore, the Smartlet™ network may be used for home charging of electric vehicles, in which case a Smartlet™ receptacle in the home is connected via a LAN and a WAN to the Smartlet™ server 140. Those skilled in the art will appreciate that the Smartlet™ network may also be used for non-vehicle applications, including selling electricity to people in places such as airports and coffee shops.

What is claimed is:

1. A charge transfer device for transferring charge between a local power grid and an electric vehicle, comprising:
   a mounting mechanism to couple the charge transfer device to a street light;
   an electric power line coupling the charge transfer device to the local power grid through a wiring box that also couples the street light to the local power grid;
   a control device on the electric power line to control application of charge transfer between the electric vehicle and the local power grid; and
   a controller to operate the control device.

2. The charge transfer device of claim 1, further comprising:
   a communication device connected to the controller to connect the controller to a mobile wireless communication device for communication between an operator of the electric vehicle and the controller.

3. The charge transfer device of claim 1, further comprising:
   a current measuring device on the electric power line to measure an amount current flowing through the electric power line; and
   wherein the controller is further to report the amount of current flowing through the electric power line to a utility company operating the local power grid.

4. The charge transfer device of claim 3, wherein the current measuring device is further to measure current flowing on an electric power line coupled with the wiring box that provides electricity to a light of the street light.

5. The charge transfer device of claim 1, further comprising:
   a transceiver coupled with the controller to connect the controller to a local area network for access to a remote server via a wide area network; and
   wherein the controller is to manage charge transfer based on power grid load data that is received from the remote server.

6. The charge transfer device of claim 5, wherein charge transfer may be in either direction between the local power grid and the electric vehicle.

7. The charge transfer device of claim 5, wherein the controller further is to manage charge transfer based on a consumer profile of an operator of the electric vehicle, wherein the consumer profile is to be received from the remote server.

8. A charge transfer system for electric vehicles, comprising:
   a local power grid operated by a utility company;
   a street light comprising:
      a light, and
      a first electric power line that couples the light with the local power grid through a wiring box; and
   a charge transfer device that transfers charge between the local power grid and electric vehicles, the charge transfer device coupled with the street light, the charge transfer device comprising:
      a second electric power line that couples the charge transfer device with the local power gird through the wiring box,
      a control device on the second electric power line to control application of charge transfer between an electric vehicle and the local power grid, and
      a controller to operate the control device.

9. The charge transfer system of claim 8, wherein the first electric power line and the second electric power line are different.

10. The charge transfer system of claim 8, wherein the first electric power line and the second electric power line are the same.

11. The charge transfer system of claim 8, wherein the charge transfer device further includes a current measuring device to measure an amount current flowing on the first electric power line and the second electric power line.

12. The charge transfer system of claim 11, wherein the controller is further to monitor the output from the current measuring device.

13. The charge transfer system of claim 12, wherein the controller further reports the amount of current flowing on the second electric power line to the utility company for accounting and billing.

14. The charge transfer system of claim 12, further comprising:
a server that is remote to the charge transfer device;
wherein the charge transfer device further comprises:
a transceiver coupled with the controller that connects the controller to a local area network for access to the server via a wide area network; and
wherein the controller manages charge transfer based on power grid load data and consumer profiles that are received from the server.

15. A method for transferring charge between a local power grid and an electric vehicle, comprising:
receiving a communication from a server coupled with a network-controlled charge transfer device that instructs the network-controlled charge transfer device to enable charge transfer;
responsive to the receiving, activating a control device to control application of charge transfer between the electric vehicle and the local power grid, wherein the charge transfer is provided through a first electrical power line that is coupled with the local power grid through a wiring box that also couples a street light to the local power grid; and
wherein the network-controlled charge transfer device is coupled with the street light.

16. The method of claim 15, wherein the communication is received as a result of a request from an operator of the electric vehicle that is received from a mobile wireless communication device of the operator of the electric vehicle.

17. The method of claim 15, further comprising:
measuring the amount of current flowing through the first electrical power line; and
reporting the amount of current flowing through the first electrical power line to a utility company operating the local power grid.

18. The method of claim 15, wherein the street light includes a light coupled with a second electrical power line that is coupled with the local power grid through the wiring box.

19. The method of claim 18, further comprising monitoring current flowing through the second electrical power line.

20. The method of claim 19, further comprising:
reporting the amount of current flowing through the second electrical power line to a utility company operating the local power grid.

* * * * *